Oct. 25, 1938.   F. J. HOOVEN   2,134,126
AIRCRAFT LANDING SYSTEM
Filed July 17, 1936   2 Sheets-Sheet 1
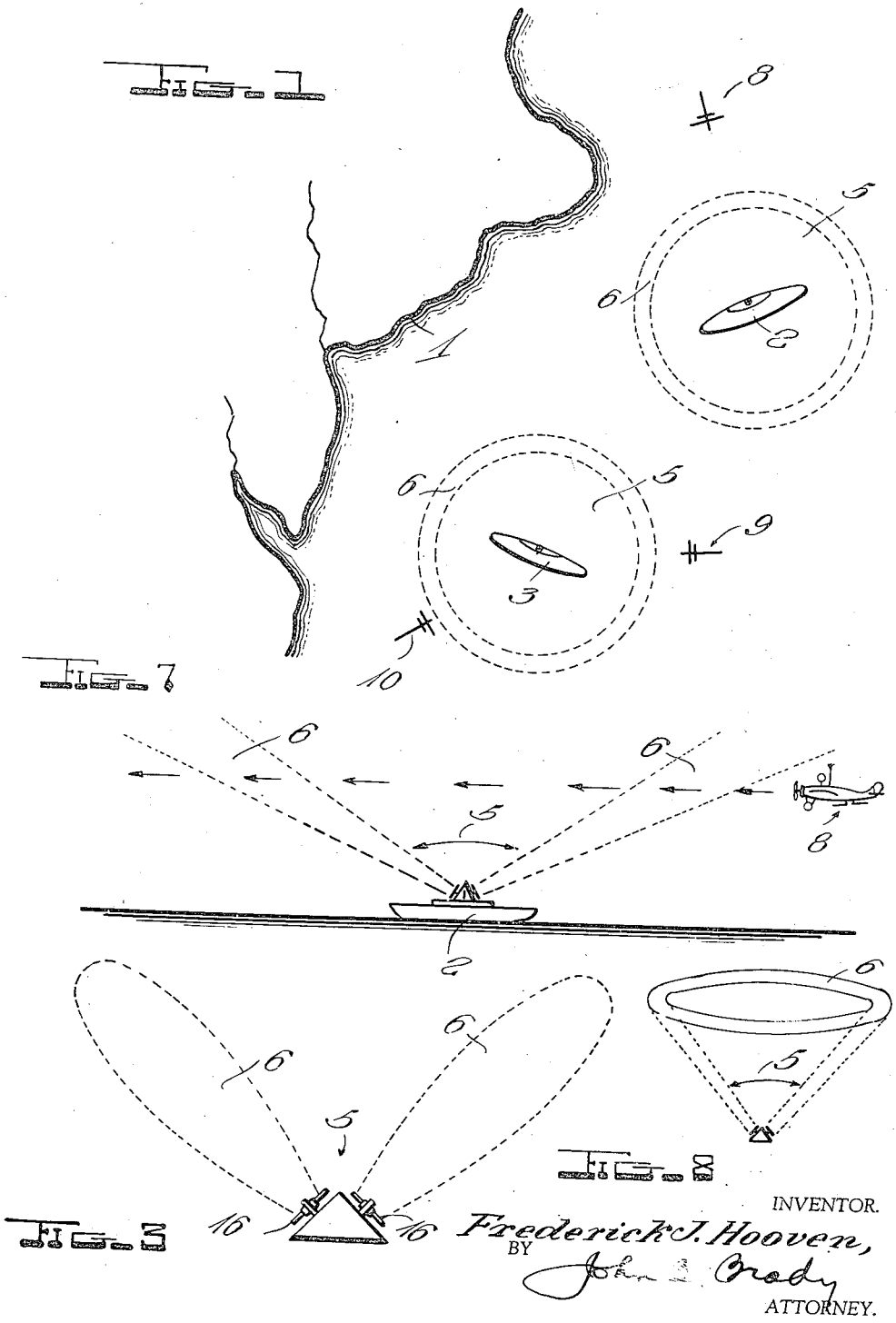
INVENTOR.
Frederick J. Hooven,
BY
ATTORNEY.

Oct. 25, 1938.  F. J. HOOVEN  2,134,126
AIRCRAFT LANDING SYSTEM
Filed July 17, 1936  2 Sheets—Sheet 2
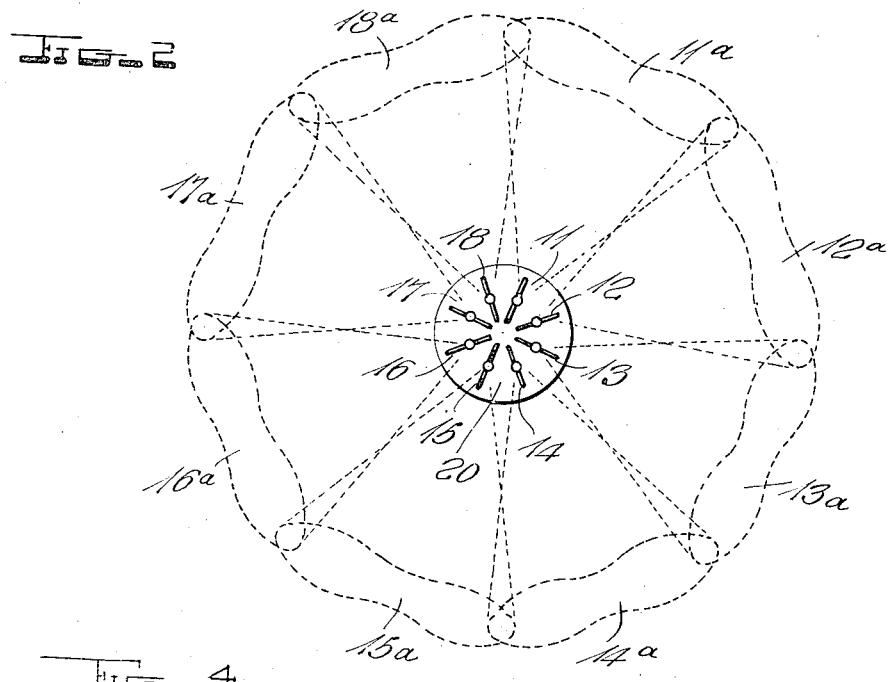
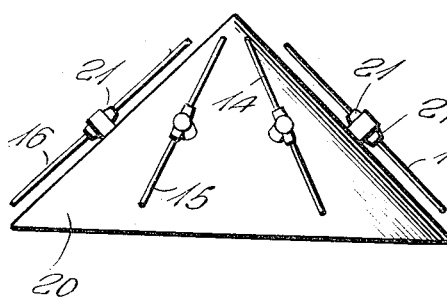
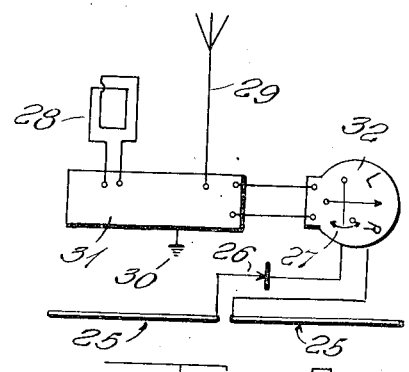
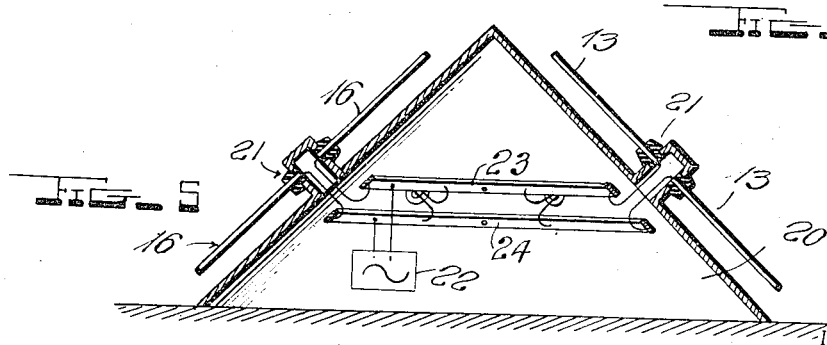
INVENTOR.
Frederick J. Hooven,
BY John B. Brady
ATTORNEY.

Patented Oct. 25, 1938

2,134,126

UNITED STATES PATENT OFFICE 2,134,126

AIRCRAFT LANDING SYSTEM

Frederick J. Hooven, Dayton, Ohio

Application July 17, 1936, Serial No. 91,192

6 Claims. (Cl. 250—11)

My invention relates broadly to aircraft landing systems, and more particularly to an aircraft landing system adapted for use on vessels, such as aircraft carriers, or commercial ships on which it is desired to land aircraft.

One of the objects of my invention is to provide a radio system for use in the landing of aircraft within a confined area, such as is encountered on aircraft carriers and commercial ships.

Another object of my invention is to provide an arrangement of ultra-high frequency system for establishing a substantially conical field of radiant energy from a relatively concentrated radiating source to provide a defined path along which aircraft may safely maneuver to effect a safe landing in a position adjacent to the ultra-high frequency source of energy.

A further object of my invention is to provide an arrangement of doublet antennae for establishing an inverted conical ultra-high frequency field of force over an aircraft landing area for enabling a pilot to be informed by operation of a responsive indicator with respect to a safe landing zone for aircraft.

Still another object of my invention resides in the method and arrangement of a multiplicity of coacting ultra-high frequency doublets, concentrated within a relatively small area and operating to establish overlapping ultra-high frequency fields of force in space above an aircraft landing field for providing a relatively sharply defined conical field of force, along which an aircraft may be maneuvered for effecting a safe landing.

A still further object of my invention is to provide a cluster of ultra-high frequency doublet antennae, mutually inclined with respect to a landing area for establishing and maintaining in space, an ultra-high frequency field of force, substantially in the shape of a hollow inverted cone.

Other and further objects of my invention reside in the construction of ultra-high frequency radiating system for aircraft landing, as set forth more fully in the specification, hereinafter following by reference to the accompanying drawings in which:

Figure 1 diagrammatically illustrates my invention as applied to aircraft carriers, and showing the manner in which an ultra-high frequency conical field of force may be established above the landing deck of the aircraft carriers for enabling the pilot of an aircraft to accurately judge the location of the deck, and effect a safe landing, even under conditions of fog, darkness and low ceiling; Fig. 2 is an enlarged plan view showing the ultra-high frequency conical field which is established by the ultra-high frequency radiation system of my invention, and illustrating the manner in which an aircraft, carrying a suitable indicator thereon, may detect the ultra-high frequency field in effecting a safe landing; Fig. 3 is a side elevational view showing the ultra-high frequency radiation system, arranged according to my invention and showing schematically the conical field of force, which is established in space above the deck of the aircraft carrier; Fig. 4 is an elevational view showing the mechanical assembly of the doublet antennae, with respect to the reflecting area used in conjunction with the doublet antennae; Fig. 5, diagrammatically illustrates the electrical connection of the excitation means with the several doublet antennae; Fig. 6, schematically illustrates the arrangement of one form of indicator or responsive apparatus which may be carried by aircraft for indicating to a pilot of an aircraft, the limits of the conical ultra-high frequency field of force over the landing field; Fig. 7, is a schematic view showing the manner in which aircraft may locate and seek a safe landing on an aircraft carrier, in accordance with the system of my invention; and Fig. 8, illustrates the manner of propagating the substantially conical shaped radio frequency field in space above the aircraft landing field.

The landing system of my invention utilizes ultra-high frequency energy. Heretofore, various landing systems have been proposed, but such systems employ energy radiated at relatively low frequency, with resulting complications in the structure of indicator apparatus on the aircraft, or the necessity of employing a complicated moving structure. The landing system of my invention is highly simplified by reason of the use of the radiation characteristics of the doublet antennae.

I make use of the principles of combining open antennae effect with the doublet antennae effect for producing a fan shaped field pattern according to the invention of Constantin D. Barbulesco, set forth in application Serial No. 4,921, filed February 4, 1935, for Ultra-high frequency marker beacon system.

In any plane of the doublet antenna the field from the center in different directions varies with the angle in accordance with the formula:

$$E = M = \frac{2I_o}{d} \frac{\cos\left(\frac{\pi}{2}\cos\alpha\right)}{\sin\alpha}$$

Where E is the electric field, M the magnetic field and Io the current at the center of the antenna, it is maximum for $$\alpha = \frac{\pi}{2}$$

and zero for $\alpha = 0$. In other words, the maximum radiation is in a direction perpendicular to the direction of the antenna proper. In the equatorial plane the field intensity remains the same at the same distances from the center.

When the doublet is disposed at a distance of a quarter wave above the surface of the ground or any reflecting surface, reflection takes place and a field pattern is produced of a character as shown in the accompanying drawings. In the zenithal direction of the center of the antenna the field is reinforced because the reflected energy is in phase with the energy radiated directly by the antenna. The field pattern discloses a fan-shaped beam with the plane of the fan perpendicular to the direction of the antenna.

I provide a reflecting surface which is substantially conical in shape. Along the inclined wall of the conical reflecting surface in insulated relation, a multiplicity of doublets are arranged in radial planes all intersecting in a central longitudinal axis, extending through the conical reflecting surface structure. In lieu of a conical reflecting surface member, I may provide a polygonal shaped structure, having inclined reflecting surfaces located immediately behind the doublet antennae. The doublet antennae are connected with a source of ultra-high frequency energy. The fan-shaped ultra-high frequency fields of force, radiated by each of the doublets, overlap in space, establishing a substantially inverted cone of ultra-high frequency energy. The ultra-high frequency field is thus established by the multiplicity of coacting doublet antennae. The indicating apparatus on the aircraft comprises simply a doublet antenna disposed in alignment with the axis of the aircraft and connected through a suitable rectifying, and if necessary an amplifying system with a suitable indicator which is activated only so long as the doublet on the aircraft is within the effective field emitted by the doublets adjacent the landing area. A cone of silence is located within the annular active zone of ultra-high frequency energy. The pilot under conditions of fog, darkness and low ceiling, may fly through the opposite walls of the ultra-high frequency zones of force, until the pilot is able to judge the limits of the landing field, and after determining the fore and aft axis of the field in the case of an aircraft carrier, is able to fly down the inclined wall of high frequency energy to effect a safe landing below.

Referring to the drawings in more detail, reference character 1, schematically illustrates a coast line remote from which the aircraft carriers 2 and 3 are located. Each of the aircraft carriers are equipped with the ultra-high frequency landing system of my invention. The ultra-high frequency transmitter on vessel 2, establishes an ultra-high frequency field of force, substantially in the shape of an inverted conical shaped zone 6 having a silent or unactivated central zone 5. Aircraft carrier 3 has an ultra-high frequency transmitter thereon, operating to establish the ultra-high frequency inverted conical shaped field of force 6, having a silent or unactivated central zone 5. I have indicated aircraft 8, 9 and 10, maneuvering to accurately locate the landing deck of the aircraft carriers.

As illustrated in Fig. 2, each aircraft carrier is equipped with a cluster of ultra-high frequency doublet antennae which have been indicated at 11, 12, 13, 14, 15, 16, 17 and 18. These doublet antennae extend substantially parallel with the reflecting surface of the structure which I have shown generally at 20. The reflecting surface structure 20 is formed from a metallic sheet which in the form of my invention illustrated is conical. However the reflecting surface 20 may be polygonal in shape, the important consideration being that the reflecting surface be inclined to effect a directive propagation of ultra-high frequency energy from the doublet antennae along the inclined path or course forming the inverted inclined wall of ultra-high frequency energy over the landing area. The doublets are insulated from the reflecting surface 20 on suitable supports such as indicated generally at 21. Connections are made to a suitable source of ultra-high frequency energy 22, through bus-bar connectors 23 and 24 shown more particularly in Fig. 5. The connection of the ultra-high frequency source 22 with the cluster of doublet antennae is such that the doublet antennae are excited in phase to establish and maintain an ultra-high frequency field of force substantially in the shape of an inverted hollow cone and having a predetermined activated wall thickness and a silent central portion.

The doublets are inclined at a sufficient angle to a central longitudinal axis extending through the reflecting surface structure to insure the upward propagation of the ultra-high frequency field of force in fan-shaped patterns 11a, 12a, 13a, 14a, 15a, 16a, 17a and 18a which overlap one with the other to form a substantially annular conical shaped wall of ultra-high frequency energy. The conical shaped wall of ultra-high frequency energy inclines upwardly with respect to the deck of the aircraft carrier 2, providing a well established and defined path along which aircraft may land with a high measure of safety.

The landing indicator for detecting the ultra-high frequency field of force is carried on the aircraft which seeks to land on the designated area, such as the aircraft at 8, 9, 10, in Fig. 1. In Fig. 6, the ultra-high frequency indicator shown schematically comprises a doublet antenna 25, connected through rectifier 26 with indicator 27. Indicator 27 is activated so long as the aircraft is within the ultra-high frequency field.

As indicated in Fig. 6, the ultra-high frequency indicator on the aircraft may be associated with the radio compass coil or loop antenna 28 and antenna 29 grounded at 30, radio compass receiver 31 and right and left hand indicator 32, with which is combined the ultra-high frequency indicator operated from doublet 25.

Where aircraft must be landed aboard ship, such as aircraft carriers and other vessels, the system of my invention is particularly desirable because of the compact manner in which the ultra-high frequency radiators may be assembled adjacent the deck. The concentrated arrangement of the multiplicity of doublets insures a high degree of precision in defining the landing area on the deck of the vessel.

My invention has been described in certain of its preferred embodiments, but I realize that modifications may be readily made and accordingly I intend no limitations upon my invention, except as may be imposed by the scope of the appended claims.

What I claim as new and desire to secure by Letters Patent of the United States is as follows:

1. In an aircraft landing system, means for establishing and maintaining an ultra-high frequency field of force above an aircraft landing area, comprising a plurality of ultra-high frequency doublet antennae, mutually inclined with respect to each other and radially assembled about a vertically extending central axis, a reflecting surface disposed behind all of said doublet antennae, and means for exciting said doublet antennae in phase for radiating an ultra-high frequency field of force substantially in the shape of an inverted hollow cone having a prepatterned wall thickness and an inert central portion.

2. In a system for landing aircraft, means for establishing and maintaining an ultra-high frequency field of force above an aircraft landing area comprising an electro-magnetic wave reflecting surface structure substantially in the form of a cone with the wall thereof inclined with respect to the plane of the landing area, a multiplicity of doublet antennae insulatingly disposed in spaced relation to said reflecting surface structure and having the opposite portions of the doublet antennae extending in alignment with each other and substantially parallel to the reflecting surface structure, and an ultra-high frequency generator connected to said doublet antennae in phase for establishing and maintaining by the overlapping relationship of the field patterns emanating from said doublet antennae in space, an ultra-high frequency field of force substantially in the shape of a hollow inverted cone having a predetermined wall thickness and an inert central portion.

3. In an aircraft landing system, an electromagnetic wave reflecting surface structure, comprising a metallic reflector extending in a plurality of directions and inclined about a central vertical axis at an angle with respect to the plane of the aircraft landing area, a plurality of ultra-high frequency doublet antennae insulatingly disposed with respect to said reflecting surface with arms of said antennae extending substantially parallel to said reflecting surface and in radial alignment with the central vertical axis of said reflecting surface structure, and an ultra-high frequency generator connected with said doublet antennae for exciting said antennae in phase and establishing and maintaining an ultra-high frequency field of force above said aircraft landing area substantially in the shape of a hollow inverted cone having a predetermined wall thickness.

4. In an aircraft landing system, means for establishing and maintaining an ultra-high frequency field of force above an aircraft landing area, comprising a plurality of ultra-high frequency doublet antennae, mutually inclined with respect to each other and radially assembled about a vertically extending central axis, a reflecting surface spaced from said antennae and having a vertical axis coincident with said vertically extending central axis, and a generator of ultra-high frequency energy connected with said doublet antennae for exciting said antennae in phase for establishing and maintaining, by the overlapping relationship of substantially fan-shaped ultra-high frequency fields of force, an ultra-high frequency field of force substantially in the shape of an inverted hollow cone having a predetermined wall thickness and an inert central portion.

5. In a system for landing aircraft, a reflecting surface structure inclined at an angle with respect to the plane of a landing area, a multiplicity of ultra-high frequency doublet antennae mutually inclined with respect to each other and radially assembled about a vertically extending central axis, said antennae being positioned in spaced relation to said reflecting surface and substantially parallel thereto, and a generator of ultra-high frequency energy connected with said doublet antennae for exciting said antennae in phase for establishing and maintaining, by the overlapping relationship of substantially fan-shaped ultra-high frequency fields of force, an ultra-high frequency field of force substantially in the shape of an inverted hollow cone having a predetermined wall thickness and an inert central portion.

6. In a system for landing aircraft, means for establishing and maintaining an ultra-high frequency field of force above an aircraft landing area comprising an electro-magnetic wave reflecting surface structure inclined at an acute angle with respect to the plane of an aircraft landing area, a multiplicity of ultra-high frequency doublet antennae mutually inclined with respect to each other and radially assembled about a vertically extending central axis, said antennae being insulatingly supported in spaced relation to said reflecting surface structure and having the opposite portions of the doublet antennae extendng in alignment with each other and parallel to the reflecting surface structure, and an ultra-high frequency generator connected to said doublet antennae in phase for establishing and maintaining by the overlapping relationship of the field patterns emanating from said doublet antennae in space, an ultra-high frequency field of force substantially in the shape of a hollow inverted cone having a predetermined wall thickness and an inert central portion.

FREDERICK J. HOOVEN.